United States Patent
Inoue

(10) Patent No.: US 12,405,349 B2
(45) Date of Patent: Sep. 2, 2025

(54) POSITION LOCATING SYSTEM, MARINE VESSEL, AND TRAILER FOR MARINE VESSEL

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 272 days.

(21) Appl. No.: 17/860,193

(22) Filed: Jul. 8, 2022

(65) Prior Publication Data
US 2023/0033273 A1    Feb. 2, 2023

(30) Foreign Application Priority Data
Jul. 27, 2021  (JP) ................. 2021-122618

(51) Int. Cl.
*G01S 5/16* (2006.01)
*B63B 79/10* (2020.01)

(52) U.S. Cl.
CPC ................ *G01S 5/16* (2013.01); *B63B 79/10* (2020.01)

(58) Field of Classification Search
CPC ....... B60P 3/1075; B63B 49/00; B63B 79/10; G01S 3/782; G01S 5/16
See application file for complete search history.

(56) References Cited

U.S. PATENT DOCUMENTS

| | | | |
|---|---|---|---|
| 2013/0077643 A1* | 3/2013 | Spears | G01B 11/00 372/24 |
| 2018/0050772 A1 | 2/2018 | Koyano et al. | |
| 2019/0227175 A1* | 7/2019 | Steinberg | G01S 17/93 |
| 2020/0286289 A1* | 9/2020 | Mitchell | G01C 15/002 |
| 2022/0281569 A1* | 9/2022 | Traub | G05D 1/0206 |

FOREIGN PATENT DOCUMENTS

| | | | | |
|---|---|---|---|---|
| DE | 102021005348 A1 * | 4/2023 | | B60D 1/36 |
| WO | 2016/163559 A1 | 10/2016 | | |

\* cited by examiner

*Primary Examiner* — Peter B Kim
(74) *Attorney, Agent, or Firm* — Keating & Bennett, LLP

(57) ABSTRACT

A position locating system to locate relative position information between a marine vessel and a trailer includes a laser scanner on a first object, that is one of a marine vessel and a trailer for the marine vessel, to reciprocatingly scan a predetermined range in a horizontal direction with laser light, a laser light receiver on a second object, that is the other of the marine vessel and the trailer, to receive laser light emitted from the laser scanner, and a position locator configured or programmed to locate relative position information between the marine vessel and the trailer based on light receiving timings when the laser light emitted from the laser scanner is received by the laser light receiver.

20 Claims, 11 Drawing Sheets

POSITION LOCATING SYSTEM, MARINE VESSEL, AND TRAILER FOR MARINE VESSEL

CROSS REFERENCE TO RELATED APPLICATIONS

This application claims the benefit of priority to Japanese Patent Application No. 2021-122618, filed on Jul. 27, 2021. The entire contents of this application are hereby incorporated herein by reference.

BACKGROUND OF THE INVENTION

1. Field of the Invention

The present invention relates to a position locating system, a marine vessel, and a trailer for a marine vessel that locate a relative position between objects.

2. Description of the Related Art

Mainly in order to smoothly perform landing of a small marine vessel and departure of the small marine vessel from the water surface, a technique that locates relative position information between a trailer and the marine vessel is known. International Publication No. WO/2016/163559 discloses a technique that obtains position information of a trailer and controls a propulsion device to perform detachment and attachment of a hull.

In the technique disclosed in International Publication No. WO/2016/163559, a plurality of transmitters is disposed on the trailer, a receiving unit is disposed on the hull, a distance between the trailer and the hull is obtained based on the strength of a signal received by the receiving unit, and the hull's own direction with respect to the trailer is obtained based on the direction of the signal. In addition, in the technique disclosed in International Publication No. WO/2016/163559, a camera such as a stereo camera, an infrared camera, or a TOF (Time of Flight) camera is disposed on the hull, and the above distance and the hull's own direction are obtained based on three-dimensional images picked up by the camera.

However, since there are few specifications mounted on the camera disclosed in International Publication No. WO/2016/163559, it is desired to propose a position locating method other than the method disclosed in International Publication No. WO/2016/163559 as an option.

SUMMARY OF THE INVENTION

Preferred embodiments of the present invention provide position locating systems, marine vessels, and trailers for marine vessels that are each able to locate relative position information between the marine vessels and the trailers.

According to a preferred embodiment of the present invention, a position locating system includes a laser scanner that is located on a first object that is one of a marine vessel and a trailer for the marine vessel to reciprocatingly scan a predetermined range in a horizontal direction with laser light, a laser light receiver on a second object that is the other of the marine vessel and the trailer to receive laser light emitted from the laser scanner, and a position locator configured or programmed to locate relative position information between the marine vessel and the trailer based on light receiving timings when the laser light emitted from the laser scanner is received by the laser light receiver.

According to another preferred embodiment of the present invention, a position locating system includes a laser scanner that is located on a first object to reciprocatingly scan a predetermined range in a horizontal direction with laser light, a laser light receiver on a second object to receive laser light emitted from the laser scanner, and a position locator configured or programmed to locate relative position information between the first object and the second object based on light receiving timings when the laser light emitted from the laser scanner is received by the laser light receiver.

According to another preferred embodiment of the present invention, a marine vessel includes the position locating system and the position locator is located on the marine vessel.

According to another preferred embodiment of the present invention, a trailer for a marine vessel includes the position locating system and the position locator is located on the trailer.

According to preferred embodiments of the present invention, the laser light receiver located on the second object receives the laser light emitted from the laser scanner located on the first object. Based on the light receiving timings, the relative position information between the marine vessel and the trailer is determined. As a result, it is possible to locate the relative position information between the marine vessel and the trailer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
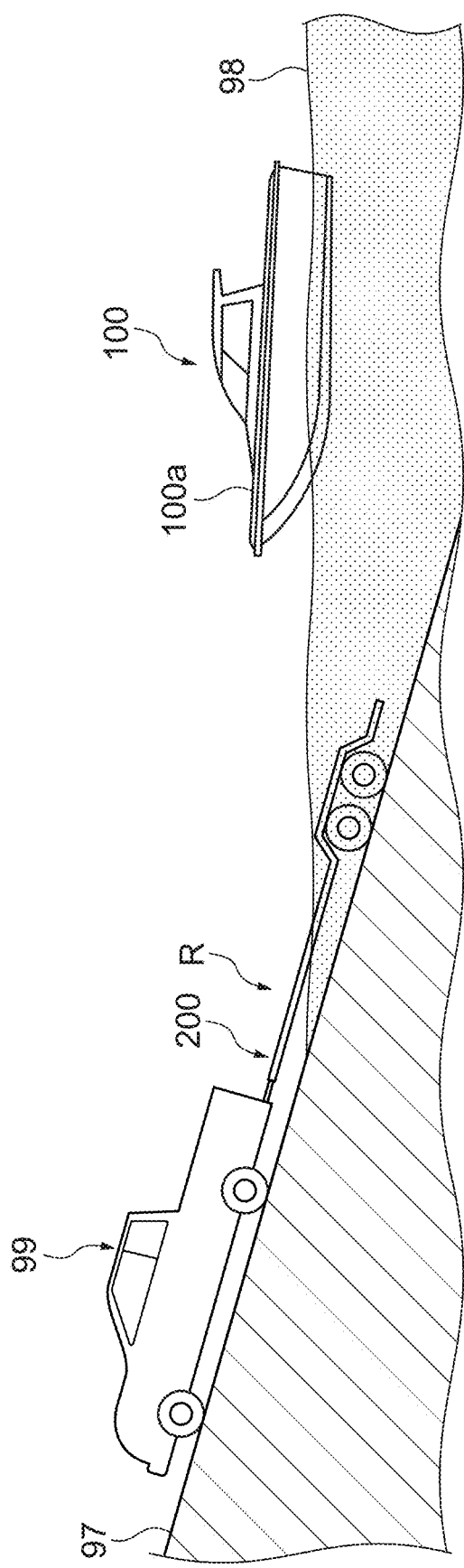
FIG. 1 is a side view that shows an example of a trailing system to which a position locating system according to a first preferred embodiment of the present invention is applied.
Figure 2:
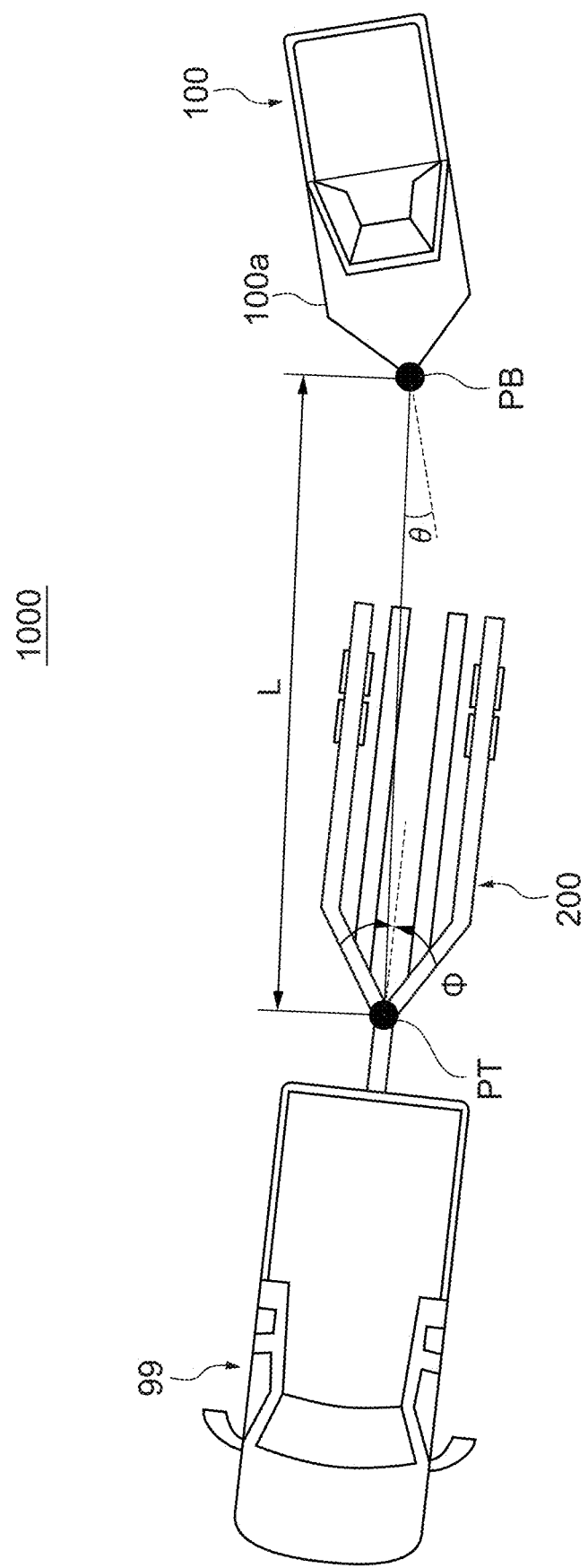
FIG. 2 is a top view that shows the example of the trailing system.

First, a first preferred embodiment of the present invention will be described. FIG. 1 is a side view that shows an example of a trailing system to which a position locating system according to the first preferred embodiment of the present invention is applied. FIG. 2 is a top view that shows the example of the trailing system. A trailing system 1000 includes a marine vessel 100, and a trailer 200 that loads the marine vessel 100. The trailer 200 is for a marine vessel towed by a vehicle 99 operated by a driver. The marine vessel 100 is, for example, a so-called jet boat.

The trailing system 1000 allows not only the marine vessel 100 to be detached from the trailer 200 and but also the marine vessel 100 to be attached to the trailer 200. An inclined portion (a ramp) R that inclines downward toward the bottom of the water is provided on the waterside. When moving the marine vessel 100 from the trailer 200 on land 97 to a water surface 98, that is, when the marine vessel 100 is detached from the trailer 200 on the land 97 (at the time of detachment), as shown in FIG. 1, the driver drives the vehicle 99 to move the trailer 200 to the inclined portion R. When switching to an automatic trailer mode, the marine vessel 100 automatically moves in a direction away from the trailer 200. As a result, detachment work of detaching the marine vessel 100 from the trailer 200 is automatically performed.

Further, when moving the marine vessel 100 from the water surface 98 to the trailer 200 on the land 97, that is, when the marine vessel 100 is attached to the trailer 200 on the land 97 (at the time of attachment), first, the driver moves the trailer 200 to the inclined portion R. When switching to the automatic trailer mode, the marine vessel 100 is automatically maneuvered and moves in a direction toward the trailer 200. As a result, attachment work of attaching the marine vessel 100 to the trailer 200 is automatically performed. Specific work of automatic detachment and automatic attachment may be realized by a publicly known method such as the method disclosed in International Publication No. WO2016/163559.

It should be noted that it is efficient to automatically perform mainly the attachment work described above after a control unit 101 functioning as a position locator locates "relative position information" between the marine vessel 100 and the trailer 200. Further, it is not essential that the marine vessel 100 is automatically detached from or attached to the trailer 200.

Here, the "relative position information" is defined as quantities when viewed from above as shown in FIG. 2, and includes a distance L, a marine vessel direction φ, and a trailer direction θ. It is assumed that reference positions necessary to define the relative position information are a reference position PT on the trailer 200 and a reference position PB on the marine vessel 100. The reference position PT may be any portion of the trailer 200 (any position at the trailer 200), and the reference position PB may be any portion of the marine vessel 100 (any position at the marine vessel 100).

The distance L is a distance between the trailer 200 (a first object) and the marine vessel 100 (a second object). That is, the distance L is a linear distance between the reference position PT and the reference position PB. The marine vessel direction φ is a direction of the marine vessel 100 as viewed from the trailer 200. The trailer direction θ is a direction of the trailer 200 as viewed from the marine vessel 100.

Figure 3:
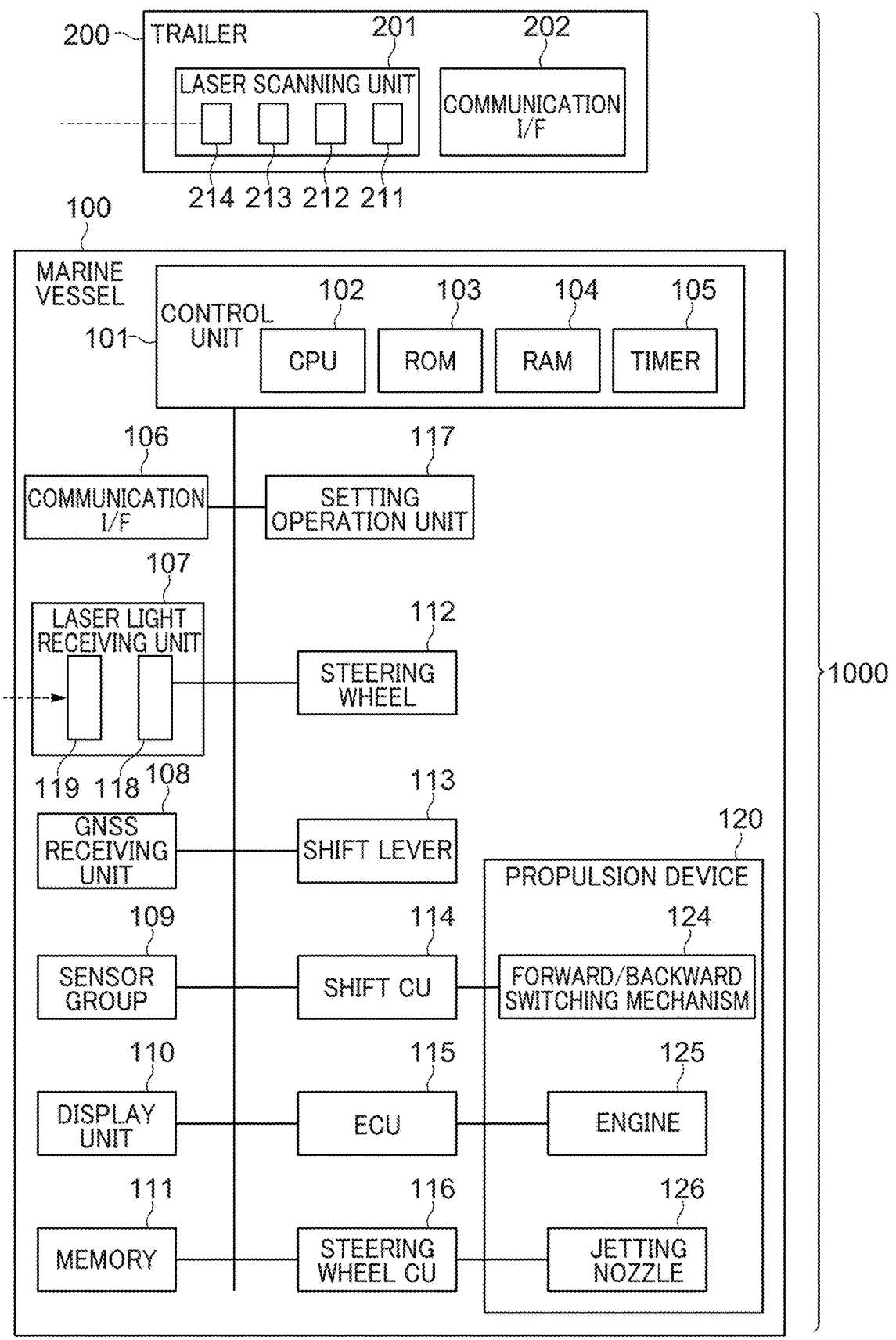
FIG. 3 is a block diagram of the trailing system.

FIG. 3 is a block diagram of the trailing system 1000. The position locating system according to the first preferred embodiment of the present invention is mainly realized by the control unit 101, a laser scanning unit 201, and a laser light receiving unit 107.

The marine vessel 100 includes a hull 100a (see FIGS. 1 and 2) and a propulsion device 120 provided on the hull 100a. The marine vessel 100 obtains a propulsive force by ejecting a jet flow of water with the propulsion device 120.

The propulsion device 120 includes an engine 125 that generates a drive force, a forward/backward switching mechanism 124 that transmits the drive force generated by the engine 125 in an adjusted state, and a jetting nozzle 126 that ejects the jet flow of water. In addition, the marine vessel 100 includes a propeller (not shown) to which the drive force generated by the engine 125 is transmitted via the forward/backward switching mechanism 124. The propulsion device 120 generates the jet flow from the jetting nozzle 126 by rotating the propeller by the drive force. Further, the marine vessel 100 adjusts a traveling direction of the marine vessel 100 by changing an ejecting direction of the jet flow from the jetting nozzle 126 generated by the rotation of the propeller.

The marine vessel 100 includes the control unit 101, an ECU (Engine Control Unit) 115, a shift CU (Control Unit) 114, and a steering wheel CU 116. The control unit 101 controls the entire marine vessel 100 including the propulsion device 120. The control unit 101 includes a CPU (Central Processing Unit) 102, a ROM (Read Only Memory) 103, a RAM (Random Access Memory) 104, and a timer 105. The ROM 103 stores control programs. The CPU 102 realizes various kinds of control processes by expanding the control programs, which are stored in the ROM 103, on the RAM 104 and executing them. The RAM 104 provides a working area for the CPU 102 to execute the control programs.

The ECU 115, the shift CU 114, and the steering wheel CU 116 control the engine 125, the forward/backward switching mechanism 124, and the jetting nozzle 126, respectively, based on instructions from the control unit 101.

The marine vessel 100 includes a sensor group 109. The sensor group 109 includes a tidal current sensor, a wind speed sensor, a hook sensor, a water landing sensor, an acceleration sensor, a speed sensor, an angular speed sensor, and an attitude sensor (none of which are shown). The hook sensor detects that a hook of the trailer 200 is hung on the hull 100a. The water landing sensor detects that the jetting nozzle 126 of the propulsion device 120 is located in the water. The acceleration sensor detects an attitude of the hull 100a by detecting an inclination of the hull 100a in addition to detecting an acceleration of the hull 100a. The speed sensor and the angular speed sensor detect a speed (a hull speed) and an angular speed of the hull 100a, respectively.

The attitude sensor includes, for example, a gyro sensor, a magnetic azimuth sensor, etc. Based on signals outputted from the attitude sensor, the shift CU 114 calculates a roll angle, a pitch angle and a yaw angle. Moreover, the shift CU 114 may calculate the roll angle and the pitch angle based on output signals of the acceleration sensor.

The hull 100a of the marine vessel 100 is provided with a steering wheel 112 and a shift lever 113. The control unit 101 controls the ejecting direction of the jet flow ejected from the jetting nozzle 126 via the steering wheel CU 116 based on a rotation angle of the operated steering wheel 112. Further, the control unit 101 performs a control to change the forward/backward switching mechanism 124 via the shift CU 114 based on a position of the operated shift lever 113.

The marine vessel 100 includes a memory 111, a display unit 110, a setting operation unit 117, a communication I/F (interface) 106, the laser light receiving unit 107, and a GNSS (Global Navigation Satellite System) receiving unit 108. The memory 111 is a non-volatile storage medium. The display unit 110 includes a display and displays various kinds of information based on the instructions from the control unit 101. The setting operation unit 117 includes an operation piece that performs operations related to marine vessel maneuvering, a setting operation piece that performs various kinds of settings, and an input operation piece that inputs various kinds of instructions (none of which are shown).

The communication I/F 106 communicates wirelessly or by wire with an external apparatus. The GNSS receiving unit 108 periodically receives a GNSS signal from a GNSS satellite. The arrangement of the laser light receiving unit 107 will be described with reference to FIG. 5. The signals received by the laser light receiving unit 107 and the GNSS receiving unit 108 are supplied to the control unit 101.

The trailer 200 includes the laser scanning unit 201 and a communication I/F 202. The communication I/F 202 communicates wirelessly or by wire with the external apparatus. The communication I/F 202 also communicates with the communication I/F 106. It should be noted that a communication method between the marine vessel 100 and the trailer 200 does not matter.

Figure 4:
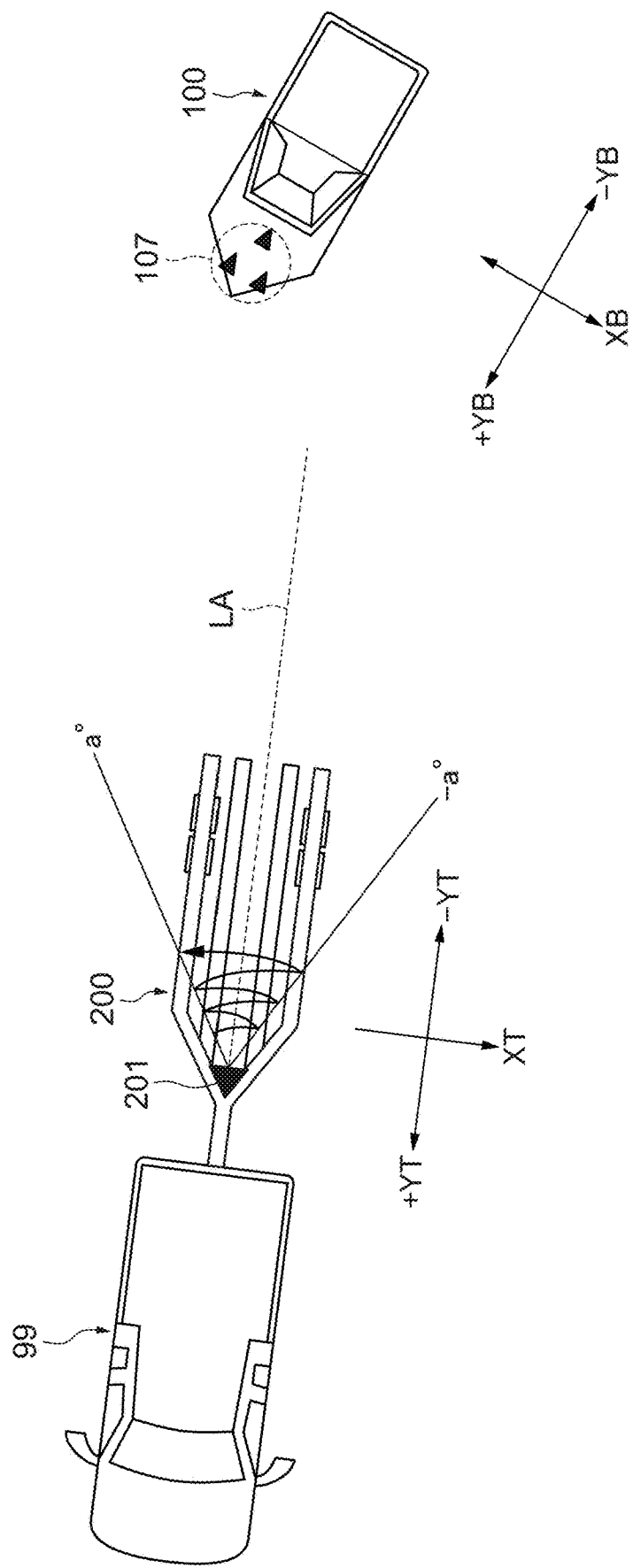
FIG. 4 is a schematic top view of the trailing system that shows an example of a positional relationship between a marine vessel and a trailer.

FIG. 4 is a schematic top view of the trailing system 1000 that shows an example of a positional relationship between the marine vessel 100 and the trailer 200.

Directions are defined for convenience based on a case that the trailer 200 is on a horizontal plane. A longitudinal direction of the trailer 200 is set as a YT direction, especially the front is set as a +YT direction and the rear is set as a −YT direction. The YT direction corresponds to a detachment and attachment direction of the marine vessel 100. Further, a crosswise direction of the trailer 200 is set as an XT direction. A front-to-rear direction of the marine vessel 100 is set as a YB direction, especially the front is set as a +YB direction and the rear is set as a −YB direction. Further, a crosswise direction of the marine vessel 100 is set as an XB direction. The laser scanning unit 201 reciprocatingly scans a predetermined range in a horizontal direction with laser light LA. The predetermined range referred to here is a scanning range, and as shown in FIG. 4, ±a, that is, a range of a° to −a° is exemplified as the scanning range.

Figure 5:
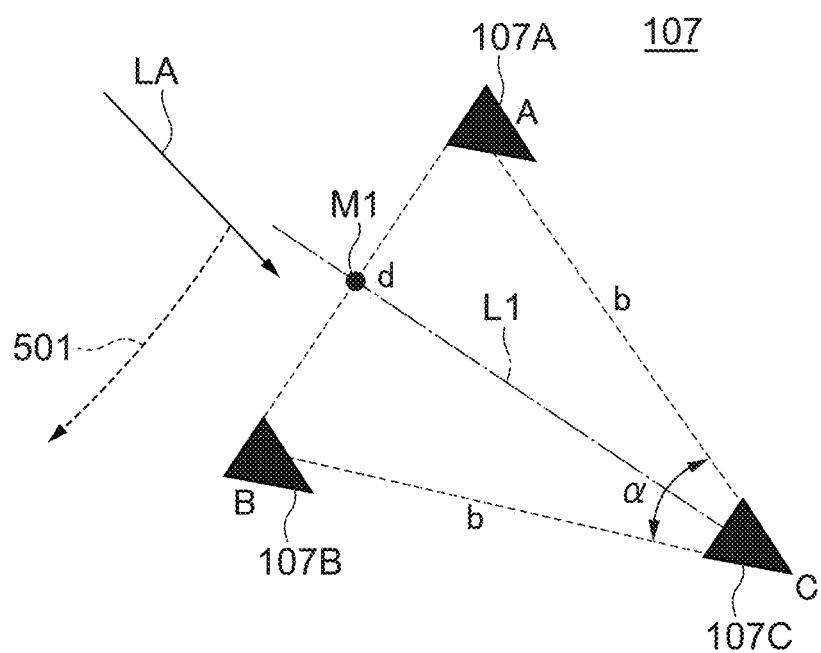
FIG. 5 is a schematic top view of a laser light receiving unit.

FIG. 5 is a schematic top view of the laser light receiving unit 107. As shown in FIG. 5, the laser light receiving unit 107 receives the laser light LA emitted from the laser scanning unit 201. Specifically, the laser light receiving unit 107 includes three light receivers (a light receiver 107A, a light receiver 107B, and a light receiver 107C). The light receiver 107A, the light receiver 107B, and the light receiver 107C have known relative positional relationships with each other. Further, the light receiver 107A, the light receiver 107B, and the light receiver 107C are located at three different positions that do not line up in a straight line when viewed from a vertical direction. Furthermore, in FIG. 5, "A,", "B", and "C" indicate positions of the light receiver 107A, the light receiver 107B, and the light receiver 107C, respectively (the same applies hereinafter).

An intermediate position between the light receiver 107A and the light receiver 107B is defined as a midpoint M1. The light receiver 107C is located on a straight line L1, which passes through the midpoint M1 and is perpendicular to a line segment connecting the light receiver 107A and the light receiver 107B when viewed from the vertical direction. In other words, a triangle whose vertexes are the light receiver 107A, the light receiver 107B, and the light receiver 107C is an isosceles triangle whose base is the line segment connecting the light receiver 107A and the light receiver 107B. As shown in FIG. 5, a length between the light receiver 107A and the light receiver 107B is defined as a length $d[m]$, both a length between the light receiver 107A and the light receiver 107C and a length between the light receiver 107B and the light receiver 107C are defined as a length $b[m]$, and an angle of <CB being an apex angle is defined as an angle $\alpha[°]$. It should be noted that it is not essential that the above triangle is an isosceles triangle.

As an example, the laser light receiving unit 107 is located on the bow of the marine vessel 100 (see FIG. 4), and the light receiver 107A and the light receiver 107B are located farther in front of the marine vessel 100 than the light receiver 107C. In the first preferred embodiment of the present invention, as an example, an arrangement position of the light receiver 107A is set as the reference position PB (see FIG. 2), and an arrangement position of the laser scanning unit 201 is set as the reference position PT.

As shown in FIG. 3, the laser scanning unit 201 includes a drive unit 211, a light source 212, a cylindrical lens 213, and a mirror 214. The drive unit 211 drives the light source 212 and causes the light source 212 to emit the laser light LA. The cylindrical lens 213 extends the laser light LA in the vertical direction so that a width of the laser light LA in the vertical direction is wider than a width of the laser light LA in the horizontal direction.

The mirror 214 is an optical member that changes an irradiation direction of the laser light LA, which is emitted from the light source 212, in the horizontal direction. The mirror 214 may be, for example, an electromagnetic one-dimensional MEMS (Micro Electro Mechanical Systems) scanner mirror. The laser light LA is reciprocatingly scanned in the horizontal direction by the mirror 214. A transition of a scanning position with respect to the lapse of time by the mirror 214 (hereinafter, referred to as "a scanning trajectory") becomes a sine wave. The drive unit 211 drives the mirror 214. The drive unit 211 causes the light source 212 to emit the laser light LA on condition that the mirror 214 is being driven. Therefore, the laser light LA will not be emitted from the light source 212 while the mirror 214 is stopped.

In order to reduce the influence of disturbances, infrared light that has a wavelength having a relatively low radiation flux density on the ground surface is used for the laser light LA. As an example, the light source 212 emits the laser light LA that has a wavelength of about 940 nm, for example. It should be noted that it is not essential that the laser light LA is infrared light.

On the other hand, as shown in FIG. 3, each of the light receiver 107A, the light receiver 107B, and the light receiver 107C of the laser light receiving unit 107 includes a photodiode 118 and a bandpass filter 119. The bandpass filter 119 is an optical filter that mainly passes light having a wavelength of about 940 nm. Each photodiode 118 receives the laser light LA via the corresponding bandpass filter 119. As a result, the influence of the disturbances is further reduced.

"A position locating process" is carried out by the following procedure. First, the driver of the vehicle 99 moves the trailer 200 to the inclined portion R. Next, a marine vessel operator moves the marine vessel 100 to a position where the laser light receiving unit 107 is included in the scanning range of the laser light LA, and maneuvers the marine vessel 100 so that the trailer 200 is substantially located in the front of the marine vessel 100 (the +YB direction). As a result, it comes into a measurement preparatory state.

Next, the marine vessel operator instructs the control unit 101 to start the position locating process via the setting operation unit 117. As a result, the laser light receiving unit 107 starts a light receiving operation. At the same time, the driver of the vehicle 99 starts the operation of the laser scanning unit 201. In the laser scanning unit 201, first, the drive unit 211 starts driving of the mirror 214, and then, after a predetermined time has elapsed, starts the operation of causing the light source 212 to emit the laser light LA. As a result, since the laser light LA is emitted after a scanning speed becomes almost constant, it is possible to enhance the accuracy of locating the relative position information. The laser light LA reciprocatingly scans the scanning range, and the laser light receiving unit 107 receives the laser light LA. The control unit 101 monitors signals that are light-received by the laser light receiving unit 107.

Figure 6A:
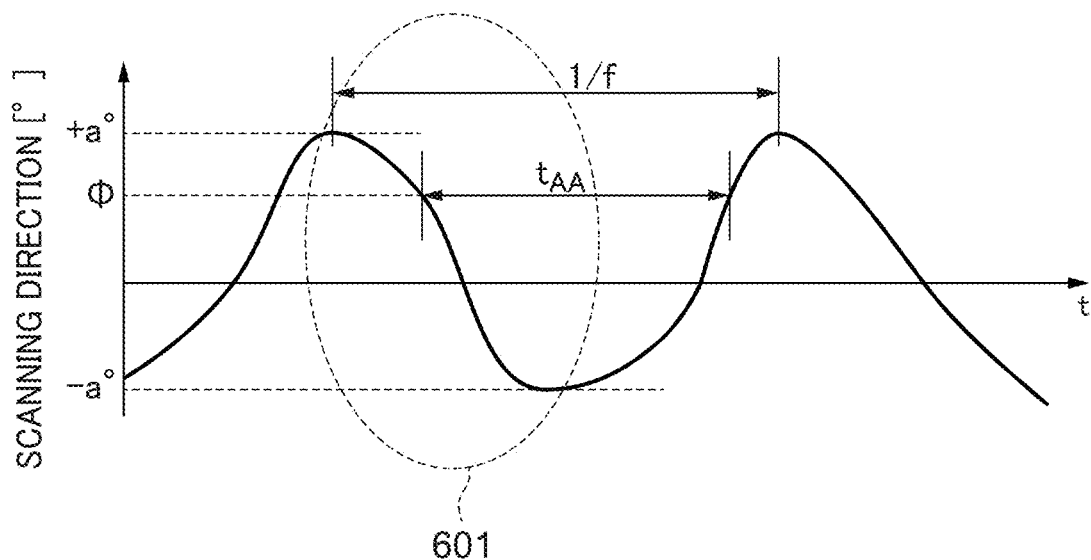
FIGS. 6A and 6B are a conceptual diagram and an enlarged diagram that show scanning of laser light, and light receiving timings in the first preferred embodiment of the present invention, respectively.
Figure 6B:
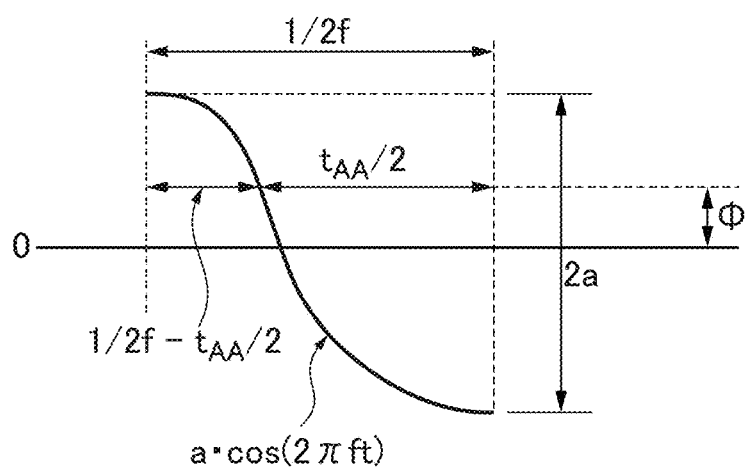

FIG. 6A is a conceptual diagram that shows scanning of the laser light LA, and light receiving timings in the first preferred embodiment of the present invention. FIG. 6B is an enlarged diagram of a portion 601 of FIG. 6A. In FIG. 6A, the horizontal axis indicates an elapsed time t, and the vertical axis indicates a scanning direction)(±a°. As shown in FIG. 6A, the scanning trajectory becomes a substantially sine wave with a period of 1/f (here, f is a scanning frequency [Hz]).

Figure 7:
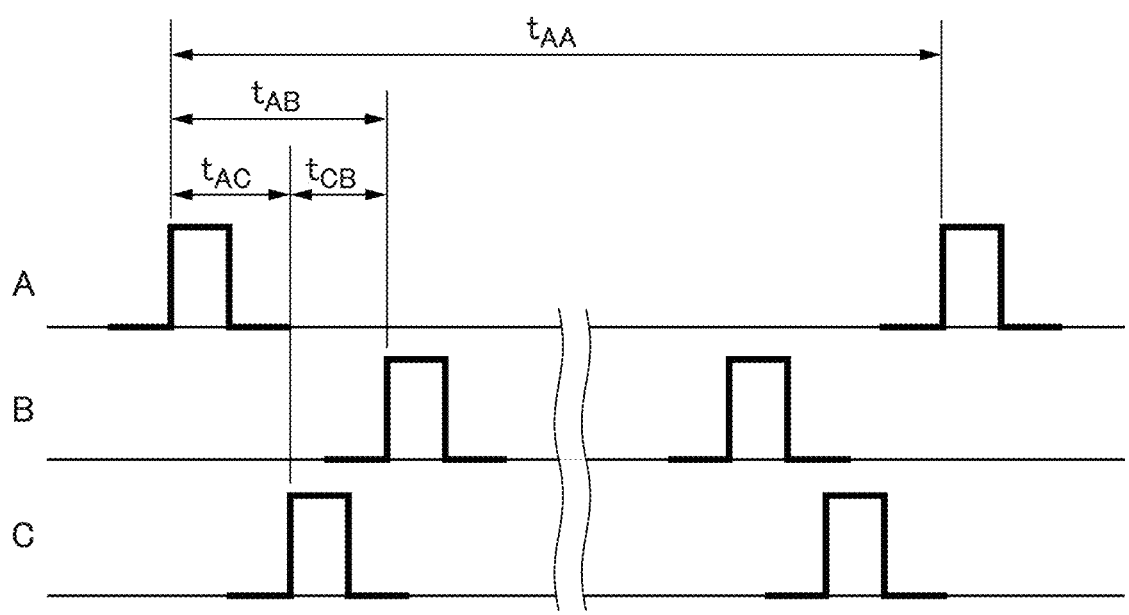
FIG. 7 is a timing chart that shows the light receiving timings by light receivers within the laser light receiving unit.

FIG. 7 is a timing chart that shows the light receiving timings by the light receiver 107A, the light receiver 107B, and the light receiver 107C within the laser light receiving unit 107. Since the laser light LA is scanned, waveforms of the signals obtained by light-receiving become pulses. Rising timings of the pulses are set to the light receiving timings. Information about the light receiving timings is sequentially stored in the RAM 104. As shown in FIG. 5, in reciprocating scanning, a direction 501 is set to a going direction, and a direction opposite to the direction 501 is set to a returning direction. Moreover, in calculating the relative position information, it does not matter which direction is the going direction.

A time period tAA [s] shown in FIG. 7 is a difference between two consecutive light receiving timings within one cycle (one round trip) by the light receiver 107A. A time period tAC [s] shown in FIG. 7 is a time required from the light receiving timing by the light receiver 107A during scanning in the going direction to the light receiving timing by the light receiver 107C immediately after that. A time period tAB [s] shown in FIG. 7 is a time required from the light receiving timing by the light receiver 107A during scanning in the going direction to the light receiving timing by the light receiver 107B immediately after that. A time period tCB [s] shown in FIG. 7 is a time required from the light receiving timing by the light receiver 107C during scanning in the going direction to the light receiving timing by the light receiver 107B immediately after that.

The control unit 101 locates the relative position information based on the light receiving timings at three different positions by the laser light receiving unit 107. First, the calculation of the marine vessel direction φ will be described. The control unit 101 locates the marine vessel direction φ based on the time period tAA. Hereinafter, the reciprocating scanning that starts from +a° will be described. That is, an example, which uses the time period tAA in one cycle from scanning from +a° in the going direction, to the completion of scanning in the returning direction, will be described.

As shown in FIG. 6A, the marine vessel direction φ corresponds to a direction of the light receiver 107A in the scanning range, and is an angle difference with respect to the center of the scanning range. In addition, as can be seen from FIG. 6B, φ=a·cos{2πf(½f−tAA/2)} holds. Therefore, the marine vessel direction φ is calculated based on the following equation (1).

$$\varphi = -a \cdot \cos(-\pi f t A A)[°] \tag{1}$$

Moreover, as the difference between two consecutive light receiving timings, although the light receiving timings in the light receiver 107A are used, the light receiving timings in the light receiver 107B or the light receiving timings in the light receiver 107C may be used.

Figure 8:
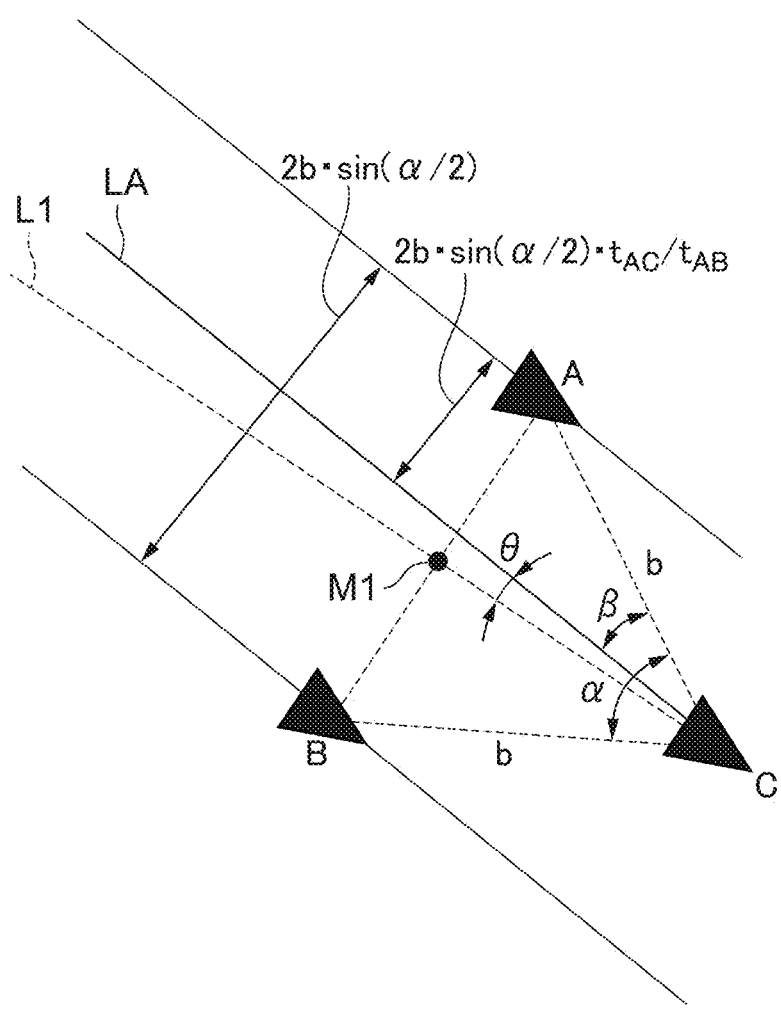
FIG. 8 is a schematic top view of the laser light receiving unit for explaining the calculation of a trailer direction.

Next, the calculation of the trailer direction θ will be described with reference to FIG. 8. FIG. 8 is a schematic top view of the laser light receiving unit 107 for explaining the calculation of the trailer direction θ. The line segment connecting the light receiver 107A and the light receiver 107B is referred to as a line segment AB, a line segment connecting the light receiver 107A and the light receiver 107C is referred to as a line segment AC, and a line segment connecting the light receiver 107B and the light receiver 107C is referred to as a line segment BC. Here, it is assumed that the laser scanning unit 201 and the laser light receiving unit 107 are sufficiently separated from each other. In addition, it is assumed that incident angles of the laser light LA with respect to the light receiver 107A, the light receiver 107B, and the light receiver 107C are common. An angle formed by an incident direction of the laser light LA, and the line segment AC is defined as an angle β.

The control unit 101 locates the trailer direction θ based on the time period tAB (a difference between the light receiving timing in the light receiver 107A and the light receiving timing in the light receiver 107B), and the time period tAC (a difference between the light receiving timing in the light receiver 107A and the light receiving timing in the light receiver 107C).

As shown in FIG. 8, first, an apparent distance between the light receiver 107A and the light receiver 107B as viewed from the incident direction of the laser light LA is 2b·sin(α/2). Therefore, an apparent distance between the light receiver 107A and the light receiver 107C as viewed from the incident direction of the laser light LA becomes 2b·sin(α/2)·tAC/tAB. Based on the above two apparent distances, β=arcsin[{2b·sin(α/2)·tAC/tAB}/b] holds. Therefore, the angle β is calculated based on the following equation (2).

$$\beta = \arcsin\{(2tAC/tAB)\cdot\sin(\alpha/2)\}[°] \tag{2}$$

Since the trailer direction θ is an angle formed by the incident direction of the laser light LA and the straight line L1 passing through the midpoint M1 (also see FIG. 5), θ=α/2−β holds. By substituting the angle β obtained by the equation (2) into this equation, the trailer direction θ is calculated based on the following equation (3).

$$\theta = \alpha/2 - \arcsin\{(2tAC/tAB)\cdot\sin(\alpha/2)\}[°] \tag{3}$$

Next, the calculation of the distance L will be described. The control unit 101 locates the distance L based on the time period tAB and the time period tAC. First, an angular speed at a time t is referred to as ω(t), and an angular speed when the laser light LA passes through the light receiver 107A is referred to as ω(φ). The angular speed ω(t) is obtained based on ω(t)=2πfa·cos(2πft)π/180[rad/s]. In addition, the angular speed ω(φ) is obtained based on ω(φ)=π^2 fa/90·cos{arcsin $(\varphi/a)\}$[rad/s]. Therefore, $\omega(\varphi)=\pi^2 2f/90 \cdot \{(a^2-\varphi^2)^{(1/2)}\}$ [rad/s] holds. Here, "^2" means squared.

A speed at which the laser light LA in the scanning direction passes through the light receiver 107A at the time of the distance L [m] is referred to as a passing speed v [m/s]. Further, the passing speed v is obtained based on $v=L\omega(\varphi)=\pi^2 2 \ fL/90\{(a^2-\varphi^2)^{(1/2)}\}$[m/s].

An apparent distance between A and B as viewed from the incident direction of the laser light LA is a distance d·cos θ[m]. Since a passing time of scanning by the laser light LA between A and B is the time period tAB, tAB=d·cos θ/v=d·cos θ/[π^2 fL/90{(a^2-φ^2)^(1/2)}][s] holds. Therefore, the distance L becomes L=d·cos θ/[π^2ftAC/90{(a^2-φ2)^(1/2)}][m]. By substituting θ calculated based on the equation (3) into 0 in this equation, the distance L is calculated based on the following equation (4).

$$L=d\cdot\cos[\alpha/2-\arcsin\{(2tAC/tAB)\cdot\sin(\alpha/2)\}]/[\pi^2 ftAB/90\{(a^2-\varphi^2)^{(1/2)}\}][m] \quad (4)$$

It should be noted that φ in the equation (4) may be substituted with φ obtained based on the equation (1).

Moreover, in calculating the trailer direction θ and the distance L, in the case of using the light receiving timing during scanning in the returning direction, a time period tBA, and a time period tBC (a difference between the light receiving timing in the light receiver 107B and the light receiving timing in the light receiver 107C) may be used instead of the time period tAB and the time period tAC. That is, the trailer direction θ and the distance L may be located based on the time period tBA and the time period tBC.

Moreover, in the first preferred embodiment of the present invention, the relative position information is calculated on the premise that no roll has occurred on the marine vessel 100. However, the control unit 101 may obtain the roll angle obtained from the attitude sensor, and may locate the relative position information based on the roll angle and the light receiving timings at respective positions. As a result, the calculation accuracy is improved in consideration of the roll. Specifically, in the equations (3) and (4), by using a roll angle γ detected, the time period tAB and the time period tAC may be corrected by multiplying the time period tAB and the time period tAC by 1/cos γ, respectively.

So far, a method that locates the distance L, the marine vessel direction φ, and the trailer direction θ as "the relative position information" based on the light receiving timings by the laser light receiving unit 107 has been described. In addition to this, as will be described below with reference to FIGS. 9A to 9D, the roll angle γ of the marine vessel 100 may be located by adding a light receiver.

Figure 9C:
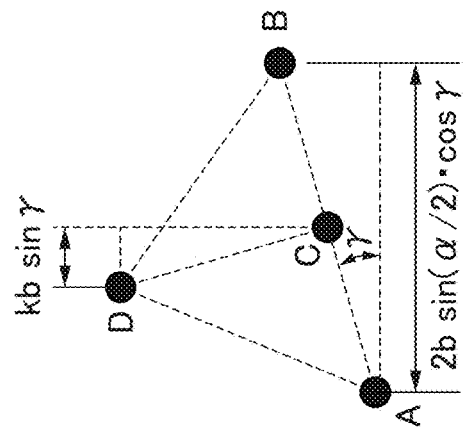
FIGS. 9A to 9D are schematic views of a laser light receiving unit that includes four light receivers.
Figure 9D:
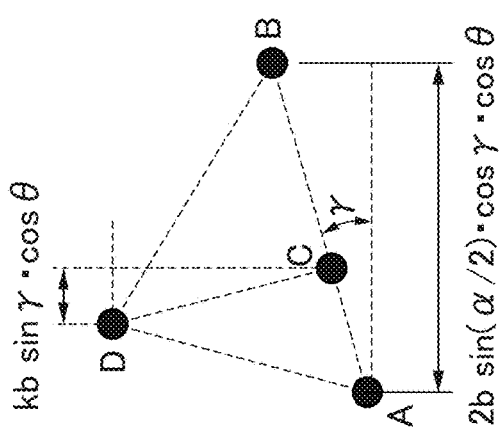
Figure 9A:
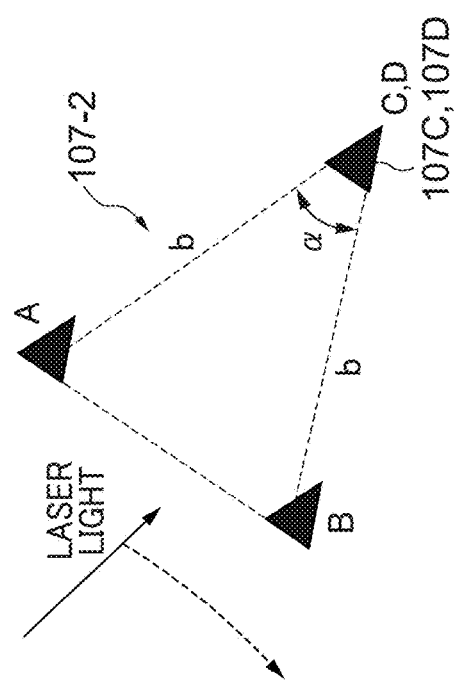
Figure 9B:
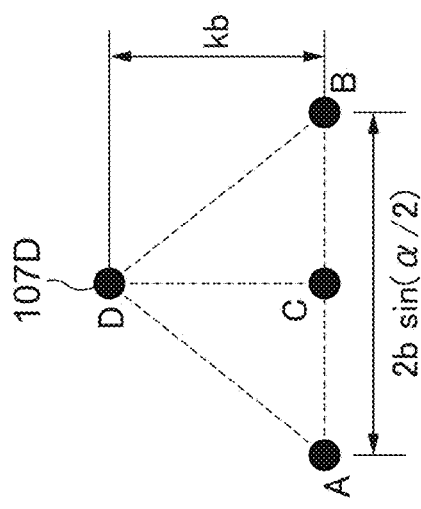

FIG. 9A is a schematic top view of a laser light receiving unit 107-2 that includes four light receivers. FIGS. 9B to 9D are schematic views that show the laser light receiving unit 107-2 as viewed from the incident direction of the laser light LA. Further, FIGS. 9C and 9D show a state in which the marine vessel 100 is rolled.

In the laser light receiving unit 107-2, a fourth light receiver 107D is added to the laser light receiving unit 107. A position of the light receiver 107D is indicated by "D". The light receiver 107D is located at a position that is not included in a virtual plane including the positions of the light receiver 107A, the light receiver 107B, and the light receiver 107C. In the example shown in FIGS. 9A to 9D, the light receiver 107D is located directly above the light receiver 107C. The position D (a fourth position) is known relative to at least the position C. The light receiver 107D also receives the laser light LA at the same time as the other light receivers (the light receiver 107A, the light receiver 107B, and the light receiver 107C).

A difference between the light receiving timing in the light receiver 107D and the light receiving timing in the light receiver 107C is referred to as a time period tDC. As shown in FIG. 9B, a distance between C and D is referred to as a distance kb. The apparent distance between A and B as viewed from the incident direction of the laser light LA is 2b·sin(α/2).

FIG. 9C shows a case that the trailer direction θ is θ and the roll angle is γ. As shown in FIG. 9C, a distance between C and D in the crosswise direction (in a left/right direction) as viewed from the incident direction of the laser light LA is kbsinγ. At this time, the apparent distance between A and B becomes 2 bsin (α/2)·cos γ.

FIG. 9D shows a case that the trailer direction θ is θ and the roll angle is γ. As shown in FIG. 9D, the distance between C and D in the crosswise direction (in the left/right direction) as viewed from the incident direction of the laser light LA is kbsinγ·cos θ. At this time, the apparent distance between A and B becomes 2 bsin (α/2)·cos γ·cos θ. Since tDC/tAB=(kbsinγ·cos θ)/{2 bsin (α/2)·cos γ·cos θ} holds, tDC/tAB=k·tan γ/2·sin(α/2)[°] holds. Therefore, the roll angle γ is calculated based on the following equation (5).

$$\gamma=\arctan\{[tDC/tAB]\cdot[2\ \sin(\alpha/2)/k]\}[°] \quad (5)$$

In this way, the control unit 101 is able to locate the roll angle γ of the marine vessel 100 based on a difference between the light receiving timing at a first position and the light receiving timing at a second position (the time period tAB), and a difference between the light receiving timing at a third position and the light receiving timing at the fourth position (the time period tDC). From this point of view, it is not essential to provide the attitude sensor in the sensor group 109. Moreover, the time period tAB and the time period tAC in the equations (3) and (4) may be corrected by using the roll angle γ located in this way.

According to the first preferred embodiment of the present invention, it is possible to locate the relative position information based on the light receiving timings by the laser light receiving unit 107, at which the laser light LA emitted from the laser scanning unit 201 is received. For example, it is possible to locate the marine vessel direction φ based on the difference between two consecutive light receiving timings in the light receiver 107A (the time period tAA). Further, it is possible to locate the trailer direction θ and the distance L based on the differences between the light receiving timings at respective positions (the time period tAC and the time period tAB).

In particular, the light receiver 107C is located on the straight line L1 that is perpendicular to the line segment connecting the light receiver 107A and the light receiver 107B when viewed from the vertical direction. As a result, since the number of cases that the position C is located between the position A and the position B when viewed from the irradiation direction of the laser light LA increases, the number of cases in which the above calculation equations can be applied increases. However, it is not essential that the light receivers have such a positional relationship.

Further, since the width of the laser light LA in the vertical direction is extended by the cylindrical lens 213, even in a situation where the marine vessel 100 is displaced in a pitch direction or totally displaced in the vertical direction, the laser light receiving unit 107 is able to easily receive the laser light LA.

Moreover, in the case that the light receiving timings are obtained over two cycles or more, it is possible to obtain a plurality of values for the time period tAA, the time period tAB, the time period tAC, and the like, respectively. In this case, respective average values of the obtained plurality of values may be used for calculating the relative position information.

Furthermore, in the case that it is only necessary to locate the marine vessel direction φ, the laser light receiving unit 107 may include only one light receiver.

Next, modification examples of the first preferred embodiment of the present invention will be described.

First, a first modification example will be described. A second laser scanning unit may be added as another laser scanning unit that has the same configuration as the laser scanning unit 201. The second laser scanning unit is a scanning unit whose scanning range is another predetermined range in the vertical direction, and is different from the laser scanning unit 201 in that the scanning direction is not in the horizontal direction but in the vertical direction. A second marine vessel direction in the vertical direction may be located based on a difference between two consecutive light receiving timings by any one of the light receivers in the laser light receiving unit 107 (a time period corresponding to the time period tAA). In the case of using any one of the light receiver 107A, the light receiver 107B, and the light receiver 107C, since any one of the light receiver 107A, the light receiver 107B, and the light receiver 107C is able to be shared for locating the marine vessel direction φ in the horizontal direction and for locating the second marine vessel direction in the vertical direction, it is not necessary to change the configuration of the laser light receiving unit 107. Moreover, in the case of using the configuration shown in FIGS. 9A to 9D, the second marine vessel direction in the vertical direction may be located based on a difference between two consecutive light receiving timings by the light receiver 107D.

In this way, by adding the second laser scanning unit, it is possible to locate not only the relative position information regarding the horizontal direction but also relative position information regarding the vertical direction (the second marine vessel direction).

Next, a second modification example will be described. The above second laser scanning unit may be added to the configuration shown in FIGS. 9A to 9D. Further, a second trailer direction with respect to the vertical direction may be located based on the light receiving timings at three positions, which do not line up in a straight line when viewed from a predetermined horizontal direction (for example, the left/right direction), among the positions of the light receiver 107A, the light receiver 107B, the light receiver 107C, and the light receiver 107D (i.e., among the positions A, B, C, and D). For example, the light receiver 107A, the light receiver 107C, and the light receiver 107D do not line up in a straight line when viewed from the left/right direction. As the relative position information regarding the vertical direction, the second trailer direction may be located based on the light receiving timings at the positions of the light receiver 107A, the light receiver 107C, and the light receiver 107D.

Next, a third modification example will be described. In addition to adding the above second laser scanning unit, a second laser light receiving unit may be added as another laser light receiving unit that has the same configuration as the laser light receiving unit 107. The second laser light receiving unit receives laser light emitted from the second laser scanning unit. The second laser light receiving unit includes three light receivers equivalent to those with a vertical arrangement of the light receiver 107A, the light receiver 107B, and the light receiver 107C. The three light receivers in the second laser light receiving unit are located so as to show a triangle when viewed from the left/right direction. In addition, the three light receivers in the second laser light receiving unit are located at three different positions that do not line up in a straight line when viewed from a predetermined horizontal direction (for example, the left/right direction).

The control unit 101 locates the relative position information regarding the vertical direction based on the light receiving timings at respective positions by the second laser light receiving unit, at which the laser light emitted from the second laser scanning unit is received. Locating of the second marine vessel direction and locating of the second trailer direction are realized by applying the processes, which locate the marine vessel direction φ and the trailer direction θ and are performed with respect to the horizontal direction, to the vertical direction. In addition, locating of the distance L is also realized by applying the process, which is performed with respect to the horizontal direction, to the vertical direction. Moreover, an average value between the distance L obtained by the process performed with respect to the horizontal direction and the distance L obtained by the process performed with respect to the vertical direction may be used as a final distance L. Furthermore, in the case that it is only necessary to locate the second marine vessel direction, the second laser light receiving unit may include only one light receiver.

In this way, by adding the second laser scanning unit and the second laser light receiving unit, it is possible to locate not only the relative position information regarding the horizontal direction but also the relative position information regarding the vertical direction (the second marine vessel direction, the second trailer direction, and the distance L).

Next, a second preferred embodiment of the present invention will be described. Although the first preferred embodiment of the present invention exemplifies the case that the scanning trajectory by the laser scanning unit 201 is a sine wave, regardless of the scanning trajectory, the calculation equations corresponding to the scanning trajectory may be applied. Therefore, it is not essential to apply an MEMS scanner mirror to the mirror 214. The second preferred embodiment of the present invention exemplifies the case that the scanning trajectory is a triangular wave. In the second preferred embodiment of the present invention, the configuration of the laser scanning unit 201 and the calculation method of the relative position information are different from that of the first preferred embodiment of the present invention.

Figure 10A:
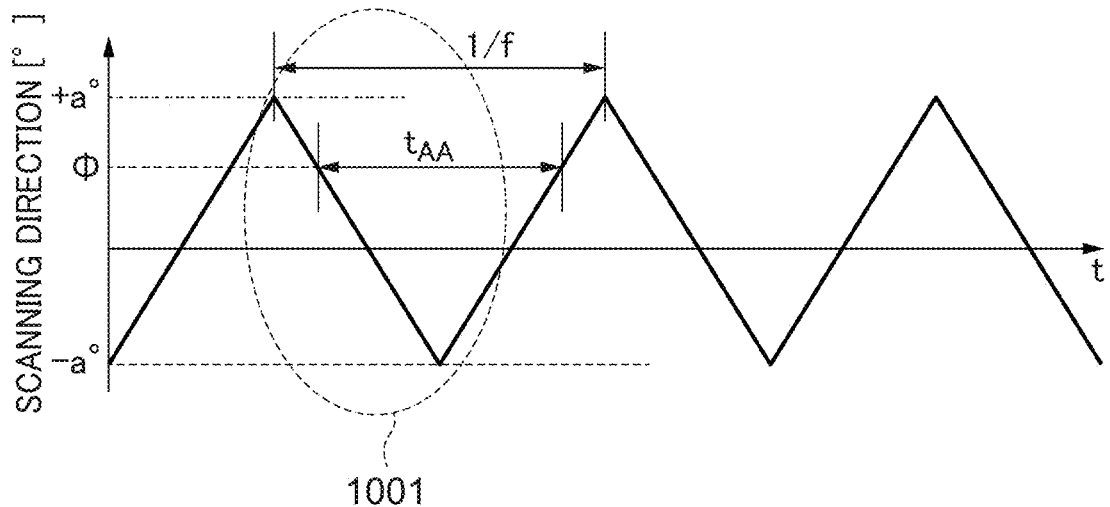
FIGS. 10A and 10B are a conceptual diagram and an enlarged diagram that show scanning of laser light, and light receiving timings in a second preferred embodiment of the present invention, respectively.
Figure 10B:
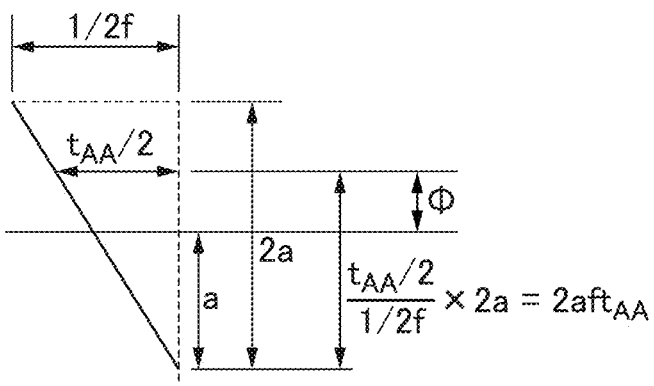

FIG. 10A is a conceptual diagram that shows scanning of the laser light LA, and light receiving timings in the second preferred embodiment of the present invention. FIG. 10B is an enlarged diagram of a portion 1001 of FIG. 10A. In FIG. 10A, the horizontal axis indicates an elapsed time t, and the vertical axis indicates a scanning direction)(±a°. As shown in FIG. 10A, the scanning trajectory becomes a substantially triangular wave with a period of 1/f (here, f is a scanning frequency [Hz]). Strictly speaking, since the vertex of the triangular wave is rounded, the relative position information calculated on the premise of the ideal waveform becomes approximate values.

The meaning of the time period tAA is the same as the one described in the first preferred embodiment of the present invention. The reciprocating scanning that starts from +a° will be described. As shown in FIG. 10B, the marine vessel direction (ID corresponds to the direction of the light receiver 107A in the scanning range, and is the angle difference with respect to the center of the scanning range. Further, an angle difference between a scanning direction of $-a°$ and a scanning direction of the light receiver 107A is $\{(tAA/2)/(\frac{1}{2}f)\} \times 2a = 2aftAA$. Therefore, the marine vessel direction $\varphi$ is calculated based on the following equation (6).

$$\varphi = 2aftAA - a[°] \tag{6}$$

In this way, even in the case that the scanning trajectory is a triangular wave, it is possible to locate the marine vessel direction $\varphi$ based on the difference between two consecutive light receiving timings in the light receiver 107A (the time period tAA).

Furthermore, the method for calculating the trailer direction $\theta$ is the same as that in the first preferred embodiment of the present invention. Therefore, the trailer direction $\theta$ is calculated based on the above equation (3).

Figure 11:
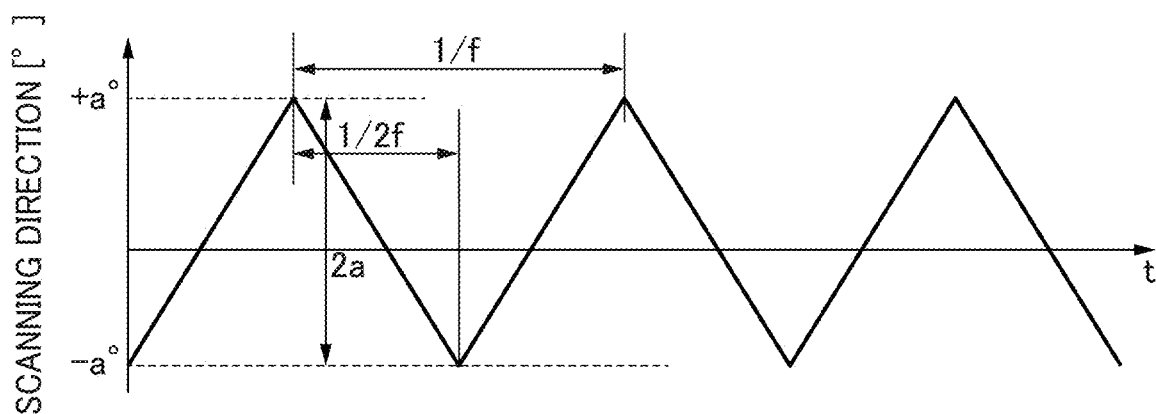
FIG. 11 is a conceptual diagram that shows the scanning of the laser light, and the light receiving timings in the second preferred embodiment of the present invention.

Next, the calculation of the distance L will be described with reference to FIG. 11. FIG. 11 is a conceptual diagram that shows the scanning of the laser light LA, and the light receiving timings in the second preferred embodiment of the present invention.

First, an angular speed $\omega$ always becomes $2a/(\frac{1}{2}f) = 4f$ [rad/s]. When A speed at which the laser light LA in the scanning direction passes through the light receiver 107A at the time of the distance L [m] is referred to as a passing speed v [m/s], $v = \omega = 4$ fL[m/s] holds. An apparent distance between A and B as viewed from the incident direction of the laser light LA is a distance $d \cdot \cos \theta$[m]. Since a passing time of scanning by the laser light LA between A and B is the time period tAB, $tAB = d \cdot \cos \theta/v = d \cdot \cos \theta/4$ fL[s] holds. Therefore, the distance L is calculated based on the following equation (7). Further, by substituting $\theta$ obtained based on the equation (3) into the equation (7), the equation (8) holds.

$$L = d \cdot \cos \theta / 4ftAB[m] \tag{7}$$

$$L = d \cdot \cos[a/2 - \arcsin\{(2tAC/tAB) \cdot \sin(\alpha/2)\}]/4ftAB[m] \tag{8}$$

In this way, even in the case that the scanning trajectory is a triangular wave, it is possible to locate the trailer direction $\theta$ and the distance L based on the differences between the light receiving timings at respective positions (the time period tAC and the time period tAB).

According to the second preferred embodiment of the present invention, the same effects as that of the first preferred embodiment of the present invention can be obtained with respect to locating the relative position information based on the light receiving timings of the laser light LA by the laser light receiving unit 107.

Furthermore, in addition to the configuration of adding the fourth light receiver 107D (see FIGS. 9A to 9D), the configurations described as the first modification example and the second modification example that add the second laser scanning unit, and the configuration described as the third modification example that adds the second laser scanning unit and the second laser light receiving unit are also applicable to the second preferred embodiment of the present invention.

In each of the first preferred embodiment and the second preferred embodiment described above, the configuration that the control unit 101 of the marine vessel 100 has a function of the position locating process which locates the relative position information is used. However, the present invention is not limited to this configuration, and the function of the position locating process may be provided on the trailer 200 or in an external communication device such as a smartphone.

Further, in each of the first preferred embodiment and the second preferred embodiment described above, although the laser scanning unit 201 is provided on the trailer 200 and the laser light receiving unit 107 is provided on the marine vessel 100, the arrangement positions of the laser scanning unit 201 and the laser light receiving unit 107 may be reversed. In other words, such a configuration may be used in which the laser scanning unit 201 is located on the first object that is one of the marine vessel 100 and the trailer 200, and the laser light receiving unit 107 is located on the second object that is the other of the marine vessel 100 and the trailer 200.

Furthermore, the objects, on which the laser scanning unit 201 and the laser light receiving unit 107 are located, do not have to be the trailer 200 and the marine vessel 100. The laser scanning unit 201 may be located on the first object, and the laser light receiving unit 107 may be located on the second object. In this case, it is possible to locate the relative position information between the two objects, the first object and the second object.

For example, such a configuration may be used in which the laser scanning unit 201 is provided on one of a pier and a marine vessel, and the laser light receiving unit 107 is provided on the other of the pier and the marine vessel. In this case, the laser scanning unit 201 or the laser light receiving unit 107 may be located on either the left or right side of the marine vessel. By doing so, it becomes easy to control marine vessel maneuvering such as stopping the marine vessel near the pier based on the relative position information that is located (obtained). Alternatively, the laser scanning unit 201 may be provided on one marine vessel, and the laser light receiving unit 107 may be provided on the other marine vessel. By doing so, it becomes easy for one marine vessel to track the other marine vessel.

Although the present invention has been described in detail based on the preferred embodiments described above, the present invention is not limited to these specific preferred embodiments, and various preferred embodiments within the scope not deviating from the gist of the present invention are also included in the present invention. Some of the above-described preferred embodiments may be combined as appropriate.

It should be noted that the present invention is not limited to be applied to jet boats, and the present invention is also able to be applied to various kinds of marine vessels that are propelled by outboard motors, inboard motors, or inboard/outboard motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A position locating system comprising:
   a laser scanner on a first object, that is one of a marine vessel and a trailer for the marine vessel, to reciprocatingly scan a predetermined range in a horizontal direction with laser light;
   a laser light receiver on a second object, that is the other of the marine vessel and the trailer, to receive laser light emitted from the laser scanner; and
   a position locator configured or programmed to locate relative position information between the marine vessel and the trailer based on light receiving timings when the laser light emitted from the laser scanner is received by the laser light receiver.

2. The position locating system according to claim 1, wherein the position locator is configured or programmed to locate a direction of the second object as viewed from the first object based on a difference between two consecutive light receiving timings.

3. The position locating system according to claim 1, wherein the laser light receiver receives the laser light emitted from the laser scanner at three different positions that have known relative positional relationships with each other and do not line up in a straight line when viewed from a vertical direction; and
the position locator is configured or programmed to locate the relative position information based on the light receiving timings at the respective positions at which the laser light emitted from the laser scanner is received by the laser light receiver.

4. The position locating system according to claim 3, wherein the three different positions include a first position, a second position, and a third position located on a straight line that is perpendicular to a line segment connecting the first position and the second position when viewed from the vertical direction.

5. The position locating system according to claim 4, wherein the position locator is configured or programmed to locate a direction of the first object as viewed from the second object based on a difference between the light receiving timing at the first position and the light receiving timing at the second position, and a difference between the light receiving timing at either the first position or the second position and the light receiving timing at the third position.

6. The position locating system according to claim 4, wherein the position locator is configured or programmed to locate a distance between the first object and the second object based on a difference between the light receiving timing at the first position and the light receiving timing at the second position, and a difference between the light receiving timing at either the first position or the second position and the light receiving timing at the third position.

7. The position locating system according to claim 4, wherein the laser light receiver also receives the laser light emitted from the laser scanner at a fourth position that is not included in a virtual plane including the third position and has a known relative position to the third position; and
the position locator is configured or programmed to locate a roll angle of the second object based on a difference between the light receiving timing at the first position and the light receiving timing at the second position, and a difference between the light receiving timing at the third position and the light receiving timing at the fourth position.

8. The position locating system according to claim 7, further comprising:
another laser scanner on the first object to reciprocatingly scan another predetermined range in the vertical direction with laser light; wherein
the laser light receiver receives laser light emitted from the another laser scanner at three positions, which do not line up in a straight line when viewed from a predetermined horizontal direction, among the first position, the second position, the third position, and the fourth position; and
the position locator is configured or programmed to locate relative position information regarding the vertical direction based on the light receiving timings at the respective positions at which the laser light emitted from the another laser scanner is received by the laser light receiver.

9. The position locating system according to claim 3, wherein the position locator is configured or programmed to obtain a roll angle of the first object, and locate the relative position information based on the obtained roll angle and the light receiving timings at the respective positions.

10. The position locating system according to claim 1, wherein a vertical direction width of the laser light emitted from the laser scanner is wider than a horizontal direction width of the laser light emitted from the laser scanner.

11. The position locating system according to claim 1, further comprising:
another laser scanner on the first object to reciprocatingly scan another predetermined range in a vertical direction with laser light; and
another laser light receiver on the second object to receive laser light emitted from the another laser scanner; wherein
the position locator is configured or programmed to locate relative position information regarding the vertical direction between the marine vessel and the trailer based on light receiving timings when the laser light emitted from the another laser scanner is received by the another laser light receiver.

12. The position locating system according to claim 11, wherein the another laser light receiver receives the laser light emitted from the another laser scanner at three different positions having known relative positional relationships with each other and do not line up in a straight line when viewed from a predetermined horizontal direction; and
the position locator is configured or programmed to locate the relative position information regarding the vertical direction based on the light receiving timings at the respective positions at which the laser light emitted from the another laser scanner is received by the another laser light receiver.

13. The position locating system according to claim 1, further comprising:
another laser scanner that the first object to reciprocatingly scan another predetermined range in a vertical direction with laser light; wherein
the position locator is configured or programmed to locate a direction of the second object in the vertical direction as viewed from the first object based on a difference between two consecutive light receiving timings.

14. The position locating system according to claim 1, wherein the laser scanner includes a light source and an optical member that changes an irradiation direction of laser light emitted from the light source, and causes the light source to emit the laser light on condition that the optical member is being driven.

15. The position locating system according to claim 1, wherein the laser light is infrared light.

16. The position locating system according to claim 1, wherein the first object is the trailer and the second object is the marine vessel.

17. A marine vessel comprising:
the position locating system according to claim 1; wherein
the position locator is located on the marine vessel.

18. A trailer for a marine vessel, the trailer comprising:
the position locating system according to claim 1; wherein
the position locator is located on the trailer.

19. A position locating system comprising:
a laser scanner on a first object to reciprocatingly scan a predetermined range in a horizontal direction with laser light;
a laser light receiver on a second object to receive laser light emitted from the laser scanner; and a position locator configured or programmed to locate relative position information between the first object and the second object based on light receiving timings when the laser light emitted from the laser scanner is received by the laser light receiver; wherein a vertical direction width of the laser light emitted from the laser scanner is wider than a horizontal direction width of the laser light emitted from the laser scanner.

20. The position locating system according to claim 19, wherein the laser light receiver receives the laser light emitted from the laser scanner at three different positions having known relative positional relationships with each other and do not line up in a straight line when viewed from the vertical direction; and the position locator is configured or programmed to locate the relative position information based on the light receiving timings at the respective positions at which the laser light emitted from the laser scanner is received by the laser light receiver.

* * * * *